United States Patent
Benveniste

(10) Patent No.: US 7,646,758 B2
(45) Date of Patent: Jan. 12, 2010

(54) METHOD AND APPARATUS FOR COORDINATING ADJACENT CHANNEL TRANSMISSIONS ON MULTIPLE RADIO NODES

(75) Inventor: Mathilde Benveniste, South Orange, NJ (US)

(73) Assignee: Avaya Inc., Basking Ridge, NJ (US)

( * ) Notice: Subject to any disclaimer, the term of this patent is extended or adjusted under 35 U.S.C. 154(b) by 519 days.

(21) Appl. No.: 11/528,298

(22) Filed: Sep. 26, 2006

(65) Prior Publication Data

US 2007/0070922 A1 Mar. 29, 2007

Related U.S. Application Data

(60) Provisional application No. 60/720,488, filed on Sep. 27, 2005.

(51) Int. Cl.
H04B 7/212 (2006.01)
(52) U.S. Cl. .................. 370/348; 370/442

(58) Field of Classification Search ........... None
See application file for complete search history.

(56) References Cited

U.S. PATENT DOCUMENTS

2007/0115915 A1* 5/2007 Sheng et al. ............... 370/350
2007/0115956 A1* 5/2007 Beshai et al. .............. 370/369

* cited by examiner

Primary Examiner—Phuc H Tran
(74) Attorney, Agent, or Firm—Chapin IP Law, LLC; David W. Rouille, Esq.

(57) ABSTRACT

A method, apparatus and computer program product for coordinating adjacent channel transmissions on multiple-radio nodes is presented. A Maximum Channel Occupancy Duration (MCOD) limit for a length of an overall transmit period is defined. A set of timers (NNAV) for each neighbor node is maintained, each of said NNAV including a first timer (CTSNNAV) for the channel which, if set, indicates the maximum duration of a transmission to said neighbor node and a second timer (RTSNNAV) for a channel which, if set, prevents the neighbor node from authorizing a transmission the channel.

20 Claims, 4 Drawing Sheets

METHOD AND APPARATUS FOR COORDINATING ADJACENT CHANNEL TRANSMISSIONS ON MULTIPLE RADIO NODES

CROSS REFERENCE TO RELATED APPLICATIONS

The present application claims the benefit of U.S. Provisional Patent Application Ser. No. 60/720,488 filed Sep. 27, 2005, the disclosure of which is incorporated herein by reference.

BACKGROUND

Wireless Local Area Networks (WLANS) have become ubiquitous. Typically, a single channel is used for wireless communication in WLANs, which is accessed through, among others, a distributed MAC protocol. [IEEE 802.11 standard] WLANS can include multiple channels and multiple radios. An approach that offers both multi-channel and multi-radio capabilities appears in the co-pending patent application titled "A Protocol For Wireless Multi-Channel Access Control", filed Mar. 29, 2006, the disclosure of which is incorporated by reference herein, which describes the CCC (Common Control Channel) MAC protocol. CCC utilizes two types of logical channels, the control channel and the data channels.

In wireless Local Area Networks (LANS), a wireless channel can be reserved for the transmission of a sequence of frames while employing asynchronous distributed random channel access methods. In such an environment, both the source and destination of the transmission broadcast the reservation duration in order to establish the interference neighborhood.

According to the 802.11 distributed channel access MAC protocol, RTS/CTS frames are used to notify neighbors of a transmission. The source and destination of the transmission send the RTS and CTS control frames, respectively, which contain the reservation duration in order to establish the interference neighborhood. Nodes receiving either control frame refrain from transmitting or agreeing to receive a transmission for the specified duration.

Growth in demand for Wireless Local Area Networks (WLANs) is driving the development of new technology to provide higher throughput. To a greater extent this growth is due to the increased number of users and applications desiring wireless transmission and to a lesser extent to the emergence of new applications needing higher transmission rates along a single connection between two points. Previous work has focused on increasing link throughput. This is necessary for single-stream high throughput applications. While it helps increase aggregate throughput, it is not the only way to do so. A MAC-based approach that enables the parallel use of multiple channels in a BSS, or a wireless mesh, can increase aggregate throughput.

IEEE 802.11 has been allocated multiple non-overlapping channels. (i.e., 3 channels are available in the 2.4 GHz ISM RF band for 802.11b/g and 12 channels in the 5 GHz U-NII RF band for 802.11a). These channels can be used simultaneously, if the transmitter on one channel and the receiver on the other have sufficient separation between them to render negligible any interference (referred to as adjacent channel interference or ACI) that would result from energy from the transmitter side lobes spreading out across the spectrum onto the other channel. When co-locating multiple radios in the same station, the interference arising when a station receives and transmits simultaneously on adjacent (in the RF spectrum) channels is so high that it blocks reception. Multiple radios are useful in increasing node-processing rates in stations where high traffic concentration is expected.

SUMMARY

Conventional mechanisms such as those explained above suffer from a variety of deficiencies. Specifically, in order to avoid ACI, transmissions by multiple-radio nodes on adjacent channels may not occur in opposite direction concurrently. Without special coordination, simply preventing concurrent transmissions at a multiple-radio node in the opposite direction could result in long queuing delays and jitter. Frames going in the same direction would be transmitted immediately, while those in the opposite direction may end up waiting for transmission for a while a node is receiving. By coordinating adjacent channel transmissions on multiple-radio nodes, it is possible to reduce queuing delay and jitter. Another problem arises when reservation requests must be declined in order to avoid ACI. To avoid repeated multiple retransmissions of a channel reservation request, proper monitoring and coordination is recommended.

In a particular embodiment of a method of coordinating adjacent channel transmissions on multiple-radio nodes, the method includes defining a Maximum Channel Occupancy Duration (MCOD) limit for a length of an overall transmit period for a given direction and maintaining at a first node a set of timers (NNAV) for each neighbor node of the first node. Each of the NNAV includes two timers. One timer (CTSNNAV) maintained for the neighbor node which, if set, indicates the maximum duration of a transmission to such neighbor node. The second timer (RTSNNAV) for a neighbor node, if set, indicates that the neighbor node is prohibited from authorizing a transmission on the channel. The method further includes wherein a neighbor node having a RTSNNAV value greater than zero indicates that such node is transmitting and would decline a request to transmit (CC-RTS) addressed to it, a neighbor node having a RTSNNAV value equal to zero and having a CTSNNAV value greater than zero defines a reservation duration value for a CC-RTS sent to this neighbor to be the same as or less than the value of the CTSNNAV, and a node having a RTSNNAV value equal to zero and having a CTSNNAV vale equal to zero defines a reservation duration value for an CC-RTS not to exceed MCOD. In the last case, when a CC-CTS is transmitted by the neighbor node, the CTSNNAV is set to the value MCOD.

In another embodiment, a method of preventing retransmissions of a channel reservation request is provided. This method includes receiving, at a first node, a reservation request from a second node. This method further includes rejecting, by the first node, the reservation request from the second node, and indicating, by the first node, a time the first node will be available to receive the reservation request by the second node.

Other embodiments include a computer readable medium having computer readable code thereon for coordinating adjacent channel transmissions on multiple-radio nodes. The medium includes instructions for defining a Maximum Channel Occupancy Duration (MCOD) limit for a length of an overall transmit period and maintaining at a first node a set of timers (NNAV) for each neighbor node of the first node. Each of the NNAV includes two timers. One timer (CTSNNAV) maintained for the neighbor node which, if set, indicates the maximum duration of a transmission to such neighbor node. The second timer (RTSNNAV) for a neighbor node, if set, prevents the neighbor node from authorizing a transmission on the channel. The medium further includes instructions wherein a neighbor node having a RTSNNAV value greater than zero indicates that such note is transmitting and would decline a request to transmit (CC-RTS) addressed to it, a neighbor node having a RTSNNAV value equal to zero and having a CTSNNAV value greater than zero defines a reservation duration value for a CC-RTS sent to this neighbor to be the same as or less than the value of the CTSNNAV, and a node having a RTSNNAV value equal to zero and having a CTSNNAV vale equal to zero defines a reservation duration value for an CC-RTS not to exceed MCOD. In the last case, when a CC-CTS is transmitted by the neighbor node, the CTSNNAV is set to the value MCOD.

A further embodiment includes a computer readable medium having computer readable code thereon for preventing retransmissions of a channel reservation request. The medium includes instructions for receiving, at a first node, a reservation request from a second node and instructions for rejecting, by the first node, the reservation request from the second node. The medium further includes instructions for indicating, by the first node, a time the first node will be available to receive the reservation request by the second node.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides a method of coordinating adjacent channel transmissions on multiple-radio nodes and for preventing retransmissions of a channel reservation request as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing a method of coordinating adjacent channel transmissions on multiple-radio nodes and for preventing retransmissions of a channel reservation request as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya Inc. of Lincroft N.J.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1A:
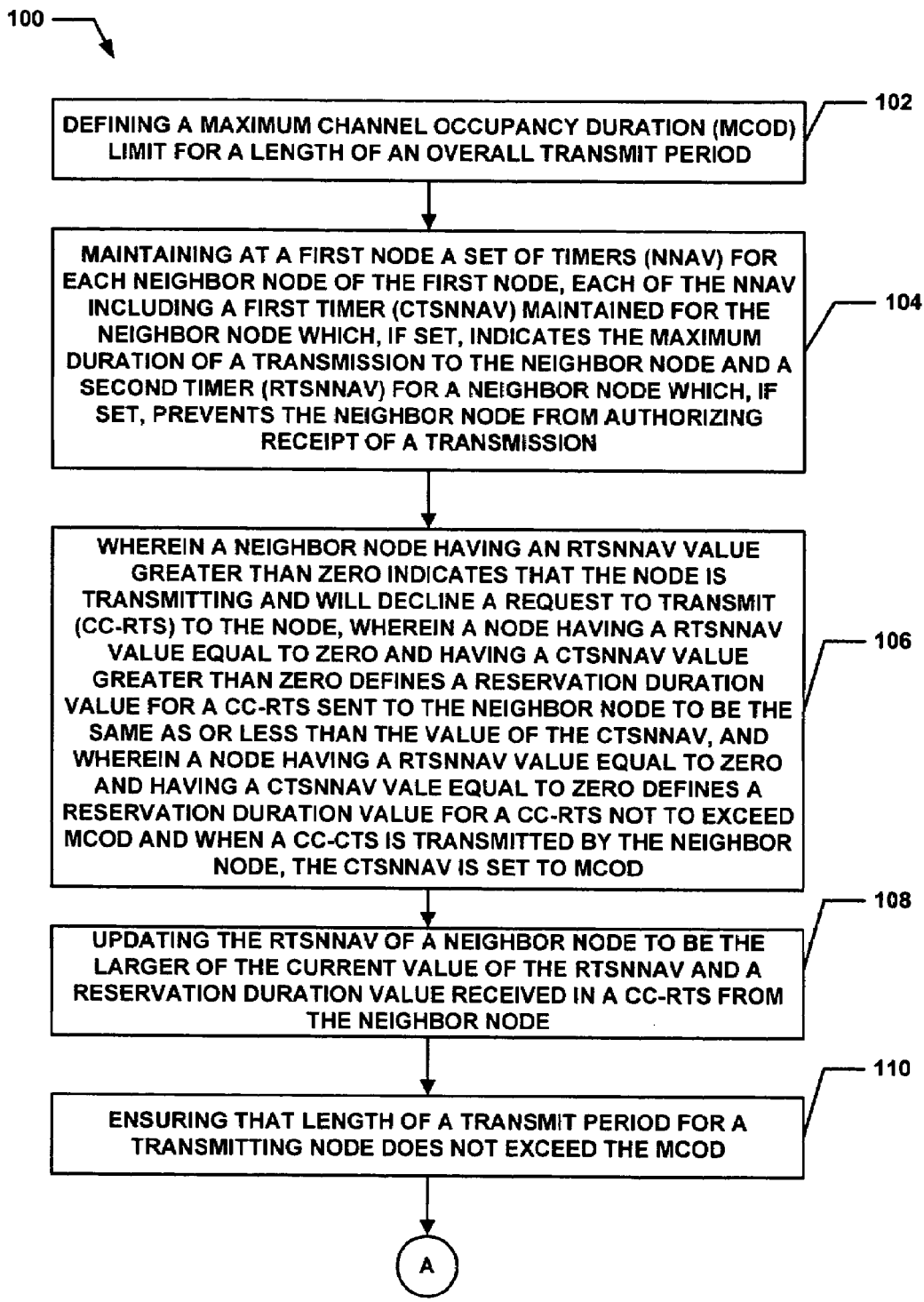
FIGS. 1A and 1B depict a flow diagram of a particular embodiment of a method of coordinating adjacent channel transmissions on multiple-radio nodes.

Adjacent channel interference (ACI) is caused by energy on channels that are adjacent in the RF spectrum. ACI is a serious problem when the receiver is close to a transmitter on an adjacent channel. A node cannot transmit and receive at once on adjacent channels.

As stated earlier, IEEE 802.11 has been allocated multiple non-overlapping channels. (i.e., 3 channels are available in the 2.4 GHz ISM RF band for 802.11b/g and 12 channels are available in the 5 GHz U-NII RF band for 802.11a). These channels can be used simultaneously, if the transmitter of one channel and receiver of the other have sufficient separation between them to render negligible any interference that would result from energy from the transmitter side lobes spreading out across the spectrum onto the other channel. When co-locating multiple radios in the same station, the interference arising when a station receives and transmits simultaneously on adjacent (in the RF spectrum) channels is so high that it blocks reception.

Avoiding use of channels with inadequate RF separation by different radios in the same station is one way to avert adjacent channel interference. Another way is to permit use of adjacent channels by co-located radios, but coordinate transmission times in order to avoid receiving and transmitting simultaneously on adjacent channels, subject of course to timing constraints imposed by the MAC protocol. The first approach reduces the number of channels that are available in a given BSS or mesh network. The second approach leads to shorter delays and greater throughput. The CCC MAC protocol relies on a combination of the above two approaches in order to avoid adjacent channel interference in multiple-radio stations. The determination regarding which approach is used depends on the type of radio(s) and the application.

The CCC protocol is a MAC protocol that provides multi-channel access by both single-radio and multiple-radio stations. It enables stations in a BSS or wireless mesh to access a pool of wireless channels available for their use. The CC-RTS/CC-CTS handshake procedure facilitates dynamic assignment of channels to the data radios without entailing any additional signaling overhead. Stations may be equipped with multiple radios to communicate with one or several other stations simultaneously without experiencing adjacent channel interference. In addition to the basic access coordination mechanism it provides, the CCC protocol also defines a rich set of new features that enables it to address special problems, such as multi-radio nodes and the associated adjacent channel interference, the hidden terminal problem, and the exposed node problem.

The multiple-channel access capability of CCC increases the aggregate throughput of a BSS or mesh network. The ability of a station to operate multiple radios simultaneously increases link and/or node throughput, which alleviates the bottleneck at points of traffic concentration—such as the AP of a BSS or the portal, or nodes near the portal, of an infrastructure mesh. A link with multiple-radio stations as endpoints can also furnish the higher data rates required by certain applications, such as HDTV signals.

CCC is backward compatible with existing 802.11 technologies. All stations, that is, both stations using existing 802.11 technology and CCC compliant stations/APs, can communicate on the control channel through the existing 802.11 MAC protocol.

The control and data channels can have different PHY protocols, and the same control channel can be used for reservation of data channels with diverse PHY protocols (e.g., 11$b$, 11$g$, or 11$n$ channels).

Adjacent channel interference can be prevented between co-located radios operating on adjacent channels by coordinating the incoming and outgoing transmissions of a station. The timing requirements of the short bi-directional CC-RTS/CC-CTS exchanges, however, on the control channel, which must occur within specified time spacing of each other, make control traffic difficult to coordinate. Hence, in order to avoid adjacent channel interference with the data radios, the channel assigned to the control radio cannot be adjacent to any of the data channels. No restrictions are required on the choice of a data channel by a station with a single data radio, provided that the data channel is not adjacent to the control channel.

Stations with multiple data radios can avoid use of adjacent data channels, thus avoiding the possibility of adjacent channel interference. In that case, acknowledgements may be sent on the same channel as data. This of course comes with a capacity penalty because, if only every third channel is allowed to be used by co-located data radios, the capacity of a wirelessly connected set (BSS or mesh) will be reduced. Such a capacity reduction is especially serious in wireless mesh networks, because connected nodes (e.g. APs) may only use non-adjacent channels. The pool of data channels allowed in the entire mesh, and its capacity, is thus reduced to one third of the maximum capacity. In WLAN systems where communication between BSSs occurs through wired infrastructure APs, different BSSs may use data channels from different non-adjacent channel sets. In fact, the probability of collisions between contiguous or partially overlapping BSSs is lower if they use different channels. The loss of capacity in that case would be due to insufficient channels becoming available to some of the BSSs when partitioning the channel pool into disjoint sets of non-adjacent channels.

A station with a free data radio may not transmit on a data channel adjacent to the one it is receiving a transmission. If a non-adjacent data channel is not available, the frames pending transmission will be queued until the received transmission is complete or will be transmitted on the control channel. A station with a free data radio may not accept a reservation to receive a transmission on a channel adjacent to the one on which it is transmitting. Acknowledgement of a successful transmission by a station receiving a transmission from a station on an adjacent channel must be sent on the control channel. Unless there are provisions for the acknowledging station to know the status of other data radios (if any) on the source of the transmission—as for instance through signaling—the acknowledgement should always be sent on the control channel.

Allowing multi-radio stations to use adjacent data channels decreases delay and increases throughput. Frames need not always wait for a non-adjacent data channel to become available before they can be transmitted by an available data radio. Under certain conditions (as described above), a frame can be transmitted immediately.

In order to enable the use of adjacent channels by multiple-radio stations, these stations and the stations communicating with them on data radios must be able to send/receive acknowledgements on the control channel. All other stations, including stations with a single radio, can send all acknowledgements on the channel used for the data traffic.

One way to avoid adjacent-channel interference is to obtain non-adjacent channels in a given band of adjacent channels. A multiple-radio node that uses a separate non-adjacent channel for acknowledgments can use adjacent channels for data traffic, provided it does not transmit and receive simultaneously on such data channels. The control channel can be used for acknowledgements. A channel different from the control channel and non-adjacent to the data channels can be used for acknowledgments. If the control channel and the acknowledgments channel are adjacent, care must be taken by a node to avoid transmitting and receiving on the two adjacent channels at once.

The control channel cannot be adjacent to a data channel of a multi-radio node. With a single-radio multi-channel access protocol, however, because the control and data channels are never used simultaneously, the control channel can be adjacent to a data channel. Thus, a natural split of the RF spectrum arises in a mixed network, where single-radio and multi-radio nodes share the same control channel. The single-radio nodes can use for data traffic the channels adjacent to the control channel, while the multi-radio nodes may use only channels non-adjacent to the control channel.

Conventional wireless networks may utilize the Common Control (CCC) Protocol for medium access control. The CCC protocol is a MAC protocol that extends the IEEE 802.11 distributed MAC protocol to enable use of multiple channels within a BSS or mesh network. The CCC protocol defines a flexible channel access architecture based on distributed prioritized contention-based medium access. The CCC protocol distinguishes between two logical channel functions, the Control Channel (CC) and the Data Channel (DC). In the description that follows, stations or mesh points observing the CCC MAC protocol are referred to as 'nodes'. Nodes exchange control and management frames on the control channel. The data channels carry data traffic.

Reservations for transmission on the various data channels are made by exchanging control frames on the control channel. As extensions of the legacy CC-RTS and CC-CTS messages, the CC-RTS and CC-CTS are used to reserve a data channel for the time it takes to transmit a Transmission Opportunity (TXOP). A TXOP is a sequence of frames (and their respective acknowledgements) transmitted serially, immediately following a single successful contention-based channel access attempt, as for instance that prescribed by the IEEE 802.11e standard. The particular data channel selected for transmission of the TXOP is indicated in a special field on the CC-RTS/CC-CTS. The CC-RTS/CC-CTS exchange could be defined so that it can reserve multiple data channels, or a data channel and the control channel, for the same time interval. A node keeps track of the length of time for which a channel(s) is reserved in a channel-specific NAV, based on the value of the Reservation Duration field of the CC-RTS/CC-CTS.

Both the forwarding and receiving node maintain a NAV for each usable channel. A node monitors the control channel and keeps track of all reservations made by other nodes to determine the busy/idle status of data channels, and when they will become available. The Reservation Duration field on the CC-RTS/CC-CTS is used to update the NAV for the channel reserved. The CC-RTS/CC-CTS Reservation Duration field is different from the Duration/ID field in the MAC header of the CC-RTS/CC-CTS frames. The latter indicates the length of the CC-RTS/CC-CTS transmission on the control channel. A reservation request is declined if the receiving node deems the requested channel busy, or if all its radios are busy.

The receiving node responds with a CC-CTS within a time interval of length Short InterFrame Space (SIFS). A CC-CTS is sent to indicate acceptance of a channel reservation request. The Reservation Duration field is copied in the CC-CTS sent by the receiving node. If a CC-CTS is not received, the forwarding node assumes that the reservation request is declined. A reservation is accepted if the data channel indicated in the CC-RTS will become idle within a pre-specified time interval, according to the NAV maintained by the receiving node and if the receiving node has available radios to receive the transmission. Successful receipt of a data traffic transmission is followed by an acknowledgement sent either on the data channel according to EDCA rules or as a group acknowledgment on the control channel.

Different frames utilized include a CC-RTS frame, used by a node initiating a TXOP. This frame includes several fields including a source node; a destination node; a source node transmit channel; a duration and a number of frames in TXOP. A CC-CTS frame is used by a node accepting a TXOP. The CC-CTS frame includes several fields including a destination node; a source node; a source node transmit channel; a duration; a number of frames in TXOP; and a Radio Counter. A CC-ACK frame identifies the individual frame in a sequence of frames that were received successfully. The CC-ACK frame includes a destination node; source node; and a TXOP frame receipt status.

Channel Reservation occurs when the source node reserves its data channel for one or multiple frames by sending a CC-RTS frame to the destination node on the control channel, provided the Channel_State indication for the data channel is idle. The Reservation Duration field and number of TXOP frames are set in the CC-RTS. The destination node sends a CC-CTS in response within SIFS. The reservation request is accepted if the destination node has a Channel_State idle indication for the source node's data channel, and the destination node has available radios to receive the transmission; i.e. the Radio Counter is non-zero. If the reservation request is accepted by the Destination node, the Reservation Duration field is adjusted and the number of frames in the TXOP is repeated in the CC-CTS sent by the destination node and the CC-CTS includes the number of its radios that remain available to receive traffic—that is the Radio Counter. (The latter is not necessary, but it is useful to other nodes with frames to send to the destination node). If the reservation request is declined by the Destination node, the Reservation Duration field in the CC-CTS is set to 0 and the source node in that case sends another CC-RTS with a Reservation Duration field set to 0. Additionally, the destination node will send a CC-CTS with a 0 in the Reservation Duration field in response to a CC-RTS with a Reservation Duration field set to 0.

When all frames in a TXOP are transmitted, the destination node will acknowledge the status of the transmit sequence by sending an acknowledgement, called CC-ACK, on the control channel. The frames received successfully will be identified in the CC-ACK. The acknowledgement will be transmitted by contention.

In accordance with particular embodiments of the present invention, adjacent channel interference is avoided if a node either transmits or receives on all its radios that are assigned adjacent channels. When a node transmits on one radio, it will not accept a reservation request from another node. A TXOP may have to wait for the current transmission to complete before it can be transmitted. To prevent frequent retransmissions of a channel reservation request, the node rejecting the reservation request can indicate the time it will be available to receive. The Busy Time field of the CC-CTS indicates when a reservation may be retried again.

In addition, a station can track the transmit status of its neighbors by keeping track of their CC-RTS/CC-CTS. A neighbor NAV (NNAV) would thus be maintained for all neighbor MPs. To prevent capture of the radio in one direction, a period of transmission in one direction will never exceed the Max Channel Occupancy Duration (MCOD) value, a parameter known to the MP. If there is no traffic in the opposite direction, the limit is reset. Two timers are set for each mesh neighbor: RTSNNAV and CTSNNAV timers.

RTSNNAV[mn] indicates whether node mn is transmitting. If RTSNNAV[mn] is greater than zero, node mn is transmitting and will be available to receive upon expiration of the timer value. It is updated according to the value of the Reservation Duration field in a CC-RTS received from a neighbor n as follows: RTSNNAV[mn] is equal to max {RTSNNAV [mn], Reservation Duration}. A transmitting node must ensure that the length of the overall transmit period does not exceed MCOD. Parallel transmissions started at a later time may have to be shortened to comply with this restriction. A node may initiate a CC-RTS to a neighbor mn that is not transmitting; i.e. RTSNNAV[mn] is equal to zero. The duration on the CC-RTS will be limited according to the length of ongoing transmissions to that node; the limit on a new CC-RTS is given by CTSNNAV[mn]. If a node remains idle, the limit on the duration of a CC-RTS is reset to MCOD.

CTSNNAV[mn] is maintained by a neighbor as a guide for setting the Duration of a CC-RTS; it indicates for how long a node mn will be able to receive data. When a node has data to transmit to neighbor mn, its reservation request will be accepted only if neighbor mn is not transmitting; i.e. if RTSNNAV[mn] is equal to zero. If CTSNNAV[mn] is greater than zero, neighbor mn may be able to receive another transmission of length not to exceed the value of this timer. The timer is set to the limit MCOD when a node first accepts a reservation to receive data; all subsequent reservations must complete by the expiration of the timer. CTSNNAV[mn] is set equal to MCOD, if CTSNNAV[mn] is equal to zero and Reservation Duration is greater than zero in the CC-CTS received from node mn. CTSNNAV[mn] remains unchanged, if CTSNNAV[mn] is greater than zero. If RTSNNAV[mn] is equal to zero and CTSNNAV[mn] is equal to zero, node mn is neither receiving nor transmitting. A neighbor may in that case request to transmit to node mn; the duration of a requested transmission must not exceed the limit MCOD.

Table 1 shows the operation of a node as it relates to the node's RTSNNAV and CTSNNAV.

TABLE 1

|  | RTSNNAV = 0 | RTSNNAV > 0 |
| --- | --- | --- |
| CTSNNAV = 0 | Node is not receiving or transmitting; the limit for CC-RTS Duration value is the max allowed, MCOD | Node is transmitting; it must decline a CC-RTS |
| CTSNNAV > 0 | Node is not transmitting; timer gives Duration limit for a CC-RTS | Node is transmitting; it must decline a CC-RTS |

Successful transmissions can be acknowledged, if desired. Nodes with a single radio (which transmit data on the control channel) can employ any of the acknowledgement forms provided by the 802.11 standard and its amendments. The same holds for nodes with two radios, one control radio and one data radio, except in certain situations when communicating with a node with multiple data radios.

Successful receipt of a TXOP on a data channel is acknowledged by sending a group acknowledgment (CC-ACK) on the control channel by contention. The acknowledgement indicates which of a specified number of frames were transmitted successfully. It is sent on the control channel either when all frames expected in a TXOP are received, regardless of errors, or after a time interval equal to reserved time, if no frames are received by that time.

NCC-ACK can be used instead of a CC-ACK. NCC-ACK is a negative group acknowledgement that indicates which of the frames of a TXOP have not been received. Acknowledgement of the NCC-ACK helps alert the sender when the NCC-ACK is lost. The NCC-ACK can be defined identically to the CC-ACK, or as its complement. The NCC-ACK is not sent if all frames were transmitted successfully. The NCC-ACK is sent on the control channel either once all frames expected in a TXOP are received, regardless of errors, or after a time interval equal to reserved time, if no frames are received by that time. A NCC-ACK will reduce control traffic if the channel is clear and collision rate low.

Figure 1B:
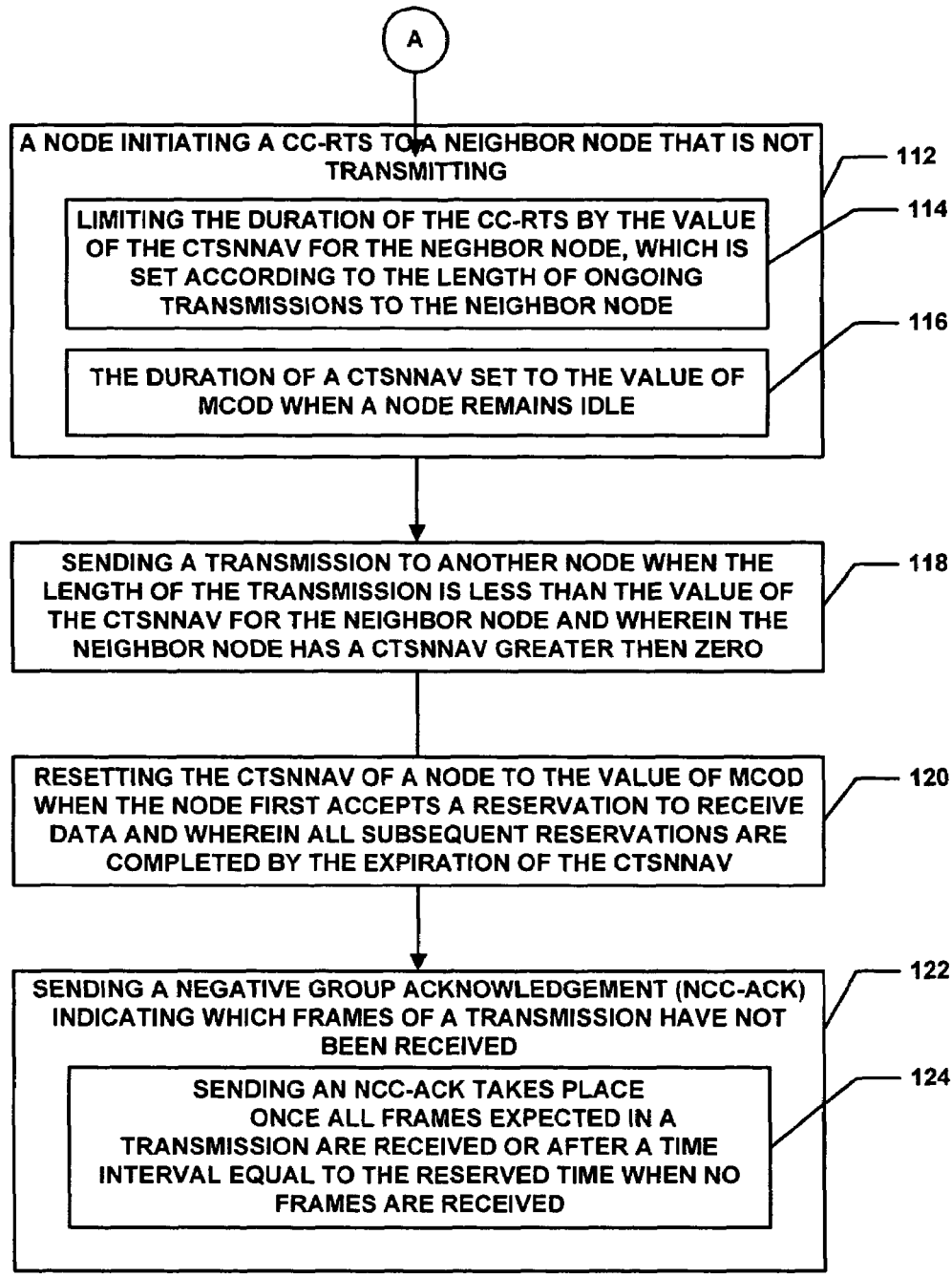
Figure 2:
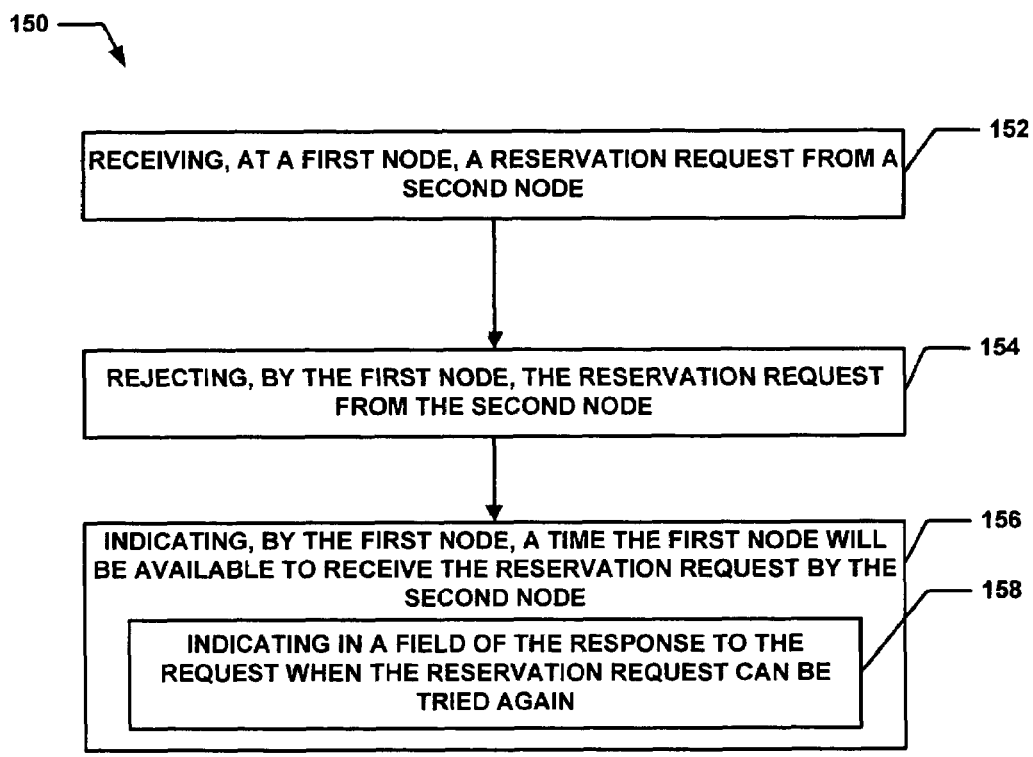
FIG. 2 depicts a flow diagram of a particular embodiment of a method for preventing retransmissions of a channel reservation request.

A flow chart of the presently disclosed method is depicted in FIGS. 1A and 1B and in FIG. 2. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIGS. 1A and 1B, a method 100 of coordinating adjacent channel transmissions on multiple-radio nodes is shown. Method 100 begins with processing block 102 which recites defining a Maximum Channel Occupancy Duration (MCOD) limit for a length of an overall transmit period Processing block 104 discloses maintaining at a first node a set of timers (NNAV) for each neighbor node of said first node, each of said NNAV including a first timer (CTSNNAV) for the neighbor node which, if set, indicates the maximum duration of a transmission to the neighbor node and a second timer (RTSNNAV) for a neighbor node which, if set, prevents the neighbor node from authorizing receipt of a transmission.

Processing block 106 states wherein a neighbor node having an RTSNNAV value greater than zero indicates that the node is transmitting and will decline a request to transmit (CC-RTS) to the node, wherein a node having a RTSNNAV value equal to zero and having a CTSNNAV value greater than zero defines a reservation duration value for a CC-RTS sent to the neighbor node to be the same as or less than the value of the CTSNNAV, and wherein a node having a RTSNNAV value equal to zero and having a CTSNNAV vale equal to zero defines a reservation duration value for a CC-RTS not to exceed MCOD and when a CC-CTS is transmitted by the neighbor node, the CTSNNAV is set to MCOD.

Processing continues with processing block 108, which recites updating the RTSNNAV of a neighbor node to be the larger of the current value of the RTSNNAV and a reservation duration value received in an CC-RTS from the neighbor node. Processing block 110 discloses ensuring that length of a transmit period for a transmitting node does not exceed said MCOD.

Processing block 112 discloses a node initiating a CC-RTS to a neighbor node that is not transmitting. As shown in processing block 114 the duration of the CC-RTS is limited by the value of the CTSNNAV for the neighbor node, which is set according to the length of ongoing transmissions to said neighbor node. As further shown in processing block 116 the duration of the CTSNNAV is set to the value of MCOD when a node remains idle.

Processing block 118 states sending a transmission to a neighbor node when the length of the transmission is less than the value of said CTSNNAV for the neighbor node and wherein said neighbor node has a CTSNNAV greater then zero.

Processing block 120 discloses resetting said CTSNNAV of a node to the value of MCOD when the node first accepts a reservation to receive data and wherein all subsequent reservations are completed by the expiration of said CTSNNAV.

Processing continues with processing block 122, which states sending a negative group acknowledgement (NCC-ACK) indicating which frames of a transmission have not been received. This may further include, as shown in processing block 124 wherein said sending an NCC-ACK once all frames expected in a transmission are received; or after a time interval equal to the reserved time when no frames are received.

Referring now to FIG. 2, a particular embodiment of a method 150 of preventing retransmissions of a channel reservation is shown. The method 150 begins with processing block 152, which discloses receiving, at a first node, a reservation request from a second node.

Processing block 154 states rejecting, by said first node, the reservation request from said second node. Processing block 156 discloses indicating, by said first node, a time said first node will be available to receive the reservation request by said second node. The indicating may be accomplished, as shown in processing block 158, by indicating in a field of the response to the request when the reservation request can be tried again.

Figure 3:
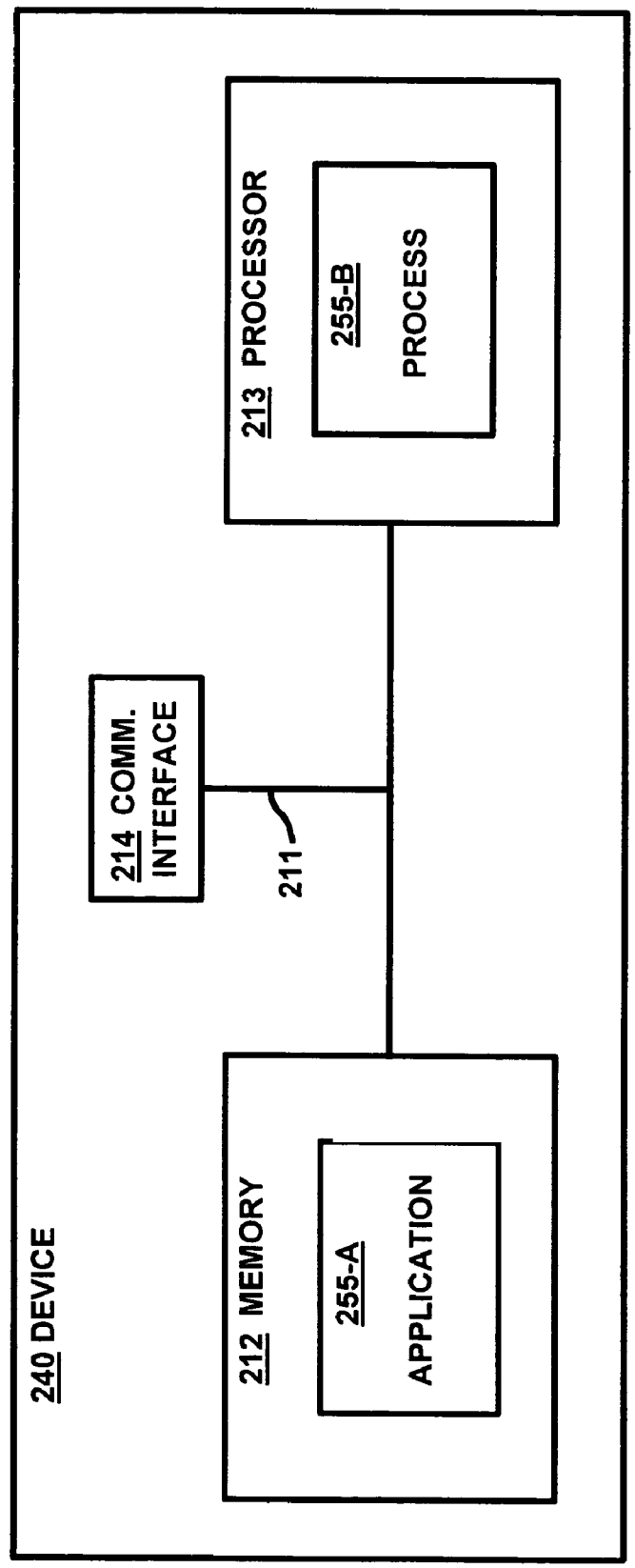
FIG. 3 illustrates an example computer system architecture for a computer system that provides a method of coordinating adjacent channel transmissions on multiple-radio nodes and for preventing retransmissions of a channel reservation request in accordance with embodiments of the invention.

FIG. 3 illustrates example architectures of a computer 240. The computer system 240 may be any type of computerized system such as a personal computer, workstation, portable computing device, mainframe, server or the like. In this example, the system includes an interconnection mechanism 211 that couples a memory system 212, a processor 213, and a communications interface 214. The communications interface 214 allows the computer system 240 to communicate with external devices or systems.

The memory system 212 may be any type of computer readable medium that is encoded with an application 255-A that represents software code such as data and/or logic instructions (e.g., stored in the memory or on another computer readable medium such as a disk) that embody the processing functionality of embodiments of the invention for the agent 255 as explained above. The processor 213 can access the memory system 212 via the interconnection mechanism 211 in order to launch, run, execute, interpret or otherwise perform the logic instructions of the applications 255-A for the host in order to produce a corresponding process 255-B. In other words, the process 255-B represents one or more portions of the application 255-A performing within or upon the processor 213 in the computer system.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method of coordinating adjacent channel transmissions on multiple-radio nodes comprising:
defining a Maximum Channel Occupancy Duration (MCOD) limit for a length of an overall transmit period;
maintaining at a first node a set of timers (NNAV) for each neighbor node of said first node, each of said NNAV including a first timer (CTSNNAV) maintained for the neighbor node which, if set, indicates the maximum duration of a transmission to said neighbor node and a second timer (RTSNNAV) for a neighbor node which, if set, indicates how long the neighbor node is expected to transmit and is thus prevented from authorizing a transmission longer than the value of CTSNAV; and
wherein a node having a RTSNNAV value equal to zero and having a CTSNNAV value greater than zero defines a reservation duration value for a CC-RTS sent to said neighbor node to be the same as the value of the CTSNNAV, and wherein a node having a RTSNNAV value equal to zero and having a CTSNNAV vale equal to zero defines a reservation duration value for a CC-RTS not to exceed MCOD and when a CC-CTS is transmitted by the neighbor node, the CTSNNAV is set to MCOD.

2. The method of claim 1 further comprising updating the RTSNNAV of a neighbor node to be the larger of the current value of the RTSNNAV and a reservation duration value received in an CC-RTS from the neighbor node.

3. The method of claim 1 further comprising ensuring that length of a transmit period for a transmitting node does not exceed said MCOD.

4. The method of claim 1 further comprising a node initiating a CC-RTS to a neighbor node that is not transmitting.

5. The method of claim 4 further comprising limiting the reservation duration of the CC-RTS according to the length of ongoing transmissions to said neighbor node.

6. The method of claim 4 further comprising resetting the reservation duration of a CC-RTS to the value of MCOD when a node remains idle.

7. The method of claim 1 further comprising sending a transmission to another node when the length of the transmission is less than the value of said CTSNNAV for the neighbor node and wherein said neighbor node has a RTSNNAV equal to zero.

8. The method of claim 1 further comprising resetting said CTSNNAV of a node to the value of MCOD when the node first accepts a reservation to receive data and wherein all subsequent reservations are completed by the expiration of said CTSNNAV.

9. The method of claim 1 further comprising sending a negative group acknowledgement (NCC-ACK) indicating which frames of a transmission have not been received.

10. The method of claim 9 wherein said sending an NCC-ACK takes place upon the occurrence of at least one of the group comprising:
once all frames expected in a transmission are received; and
after a time interval equal to the reserved time when no frames are received.

11. A computer readable medium having computer readable code thereon for coordinating adjacent channel transmissions on multiple-radio nodes, the medium comprising:
instructions for defining a Maximum Channel Occupancy Duration (MCOD) limit for a length of an overall transmit period;
instructions for maintaining at a first node a set of timers (NNAV) for each neighbor node of said first node, each of said NNAV including a first timer (CTSNNAV) maintained for the neighbor node which, if set, indicates the maximum duration of a transmission to said neighbor node and a second timer (RTSNNAV) for a neighbor node which, if set, indicates how long the neighbor node is expected to transmit and is thus prevented from authorizing a transmission longer than the value of CTSNAV; and instructions for wherein a node having a RTSNNAV value equal to zero and having a CTSNNAV value greater than zero defines a reservation duration value for a CC-RTS sent to said neighbor node to be the same as the value of the CTSNNAV, and wherein a node having a RTSNNAV value equal to zero and having a CTSNNAV vale equal to zero defines a reservation duration value for a CC-RTS not to exceed MCOD and when a CC-CTS is transmitted by the neighbor node, the CTSNNAV is set to MCOD.

12. The computer readable medium of claim 11 further comprising instructions for updating the RTSNNAV of a neighbor node to be the larger of the current value of the RTSNNAV and a reservation duration value received in an CC-RTS from the neighbor node.

13. The computer readable medium of claim 11 further comprising instructions for ensuring that length of a transmit period for a transmitting node does not exceed said MCOD.

14. The computer readable medium of claim 11 further comprising instructions for a node initiating a CC-RTS to a neighbor node that is not transmitting.

15. The computer readable medium of claim 14 further comprising instructions for limiting the reservation duration of the CC-RTS according to the length of ongoing transmissions to said neighbor node.

16. The computer readable medium of claim 14 further comprising instructions for resetting the reservation duration of a CC-RTS to the value of MCOD when a node remains idle.

17. The computer readable medium of claim 11 further comprising instructions for sending a transmission to another node when the length of the transmission is less than the value of said CTSNNAV for the neighbor node and wherein said neighbor node has a RTSNNAV equal to zero.

18. The computer readable medium of claim 11 further comprising instructions for resetting said CTSNNAV of a node to the value of MCOD when the node first accepts a reservation to receive data and wherein all subsequent reservations are completed by the expiration of said CTSNNAV.

19. The computer readable medium of claim 11 further comprising instructions for sending a negative group acknowledgement (NCC-ACK) indicating which frames of a transmission have not been received.

20. The computer readable medium of claim 19 wherein said instructions for sending an NCC-ACK takes place upon the occurrence of at least one of the group comprising:

once all frames expected in a transmission are received; and after a time interval equal to the reserved time when no frames are received.

\* \* \* \* \*